United States Patent
Yeh et al.

(10) Patent No.: US 6,353,459 B1
(45) Date of Patent: Mar. 5, 2002

(54) METHOD AND APPARATUS FOR DOWN CONVERSION OF VIDEO DATA

(75) Inventors: Gerard K. Yeh, Redwood City; Hsiang O-Yang, Santa Clara; David Auld, San Jose, all of CA (US)

(73) Assignee: Teralogic, Inc., Mountain View, CA (US)

( * ) Notice: Subject to any disclaimer, the term of this patent is extended or adjusted under 35 U.S.C. 154(b) by 0 days.

(21) Appl. No.: 09/283,823

(22) Filed: Mar. 31, 1999

(51) Int. Cl.⁷ .................................................. H04N 7/01
(52) U.S. Cl. ...................................... 348/441; 348/445
(58) Field of Search ............................... 348/441, 445, 348/459, 458, 446, 448, 443, 456, 715; H04N 7/01

(56) References Cited

U.S. PATENT DOCUMENTS

| | | | |
|---|---|---|---|
| 4,519,041 A | | 5/1985 | Fant et al. .................. 364/552 |
| 4,645,459 A | | 2/1987 | Graf et al. ..................... 434/43 |
| 4,835,532 A | | 5/1989 | Fant ........................... 340/728 |
| 5,327,235 A | * | 7/1994 | Richards .................... 348/441 |
| 5,373,375 A | * | 12/1994 | Weldy ........................ 358/523 |
| 5,485,216 A | * | 1/1996 | Lee ............................ 348/441 |
| 5,734,435 A | * | 3/1998 | Wilson et al. .............. 348/459 |
| 5,781,241 A | * | 7/1998 | Donovan .................... 348/441 |
| 5,905,536 A | * | 5/1999 | Morton et al. ............. 348/441 |
| 5,912,711 A | * | 6/1999 | Lin et al. .................... 348/446 |
| 5,914,753 A | * | 6/1999 | Donovan .................... 348/441 |
| 6,118,486 A | * | 9/2000 | Reitmeier ................... 348/441 |
| 6,133,956 A | * | 10/2000 | Ludgate et al. ............ 348/458 |
| 6,144,412 A | * | 11/2000 | Hirano et al. .............. 348/445 |
| 6,177,922 B1 | * | 1/2001 | Schiefer et al. ............ 345/132 |

OTHER PUBLICATIONS

Unirted States Advanced Television Systems Committee Ghost Canceling Reference Signal for NTSC—ATSC STD Doc. A/49 Aug. 14, 1992, May 13, 1993 pp. 1–6.

United States Advanced Television Systems Committee ATSC Digital Television Standard—ATSC STD Doc. A/53 Apr. 12, 1995, Sep. 16, 1995 pp. 1–64.

* cited by examiner

Primary Examiner—Michael Lee
Assistant Examiner—Jean W. Désir
(74) Attorney, Agent, or Firm—Blakely, Sokoloff, Taylor & Zafman LLP

(57) ABSTRACT

The invention provides a method and apparatus for conversion of video data from a source format to a second destination. Conversion can be performed in real time and intermediate data is stored in a buffer. Converted video data is written into the buffer at a first rate and read out of the buffer at a second rate. In order to avoid overflow and underflow conditions, a threshold value is determined based, at least in part, on the video format being converted. The threshold value indicates a point in frame conversion at which converted data is read out of the buffer.

21 Claims, 5 Drawing Sheets

METHOD AND APPARATUS FOR DOWN CONVERSION OF VIDEO DATA

FIELD OF THE INVENTION

The invention relates to video data processing. More particularly, the invention relates to real time conversion of video data.

BACKGROUND OF THE INVENTION

Video data encoded according to National Television Standards Committee (NTSC) standard in the United States has a frame size of 720 pixels wide by 480 pixels high and a frame rate of 30 interlaced frames per second. Other video data encoding formats exist, for example, Phase Alternation Line (PAL) and Séquentiel Couleurs à Mémoire (SECAM). These formats are sometimes referred to as standard definition (SD) formats.

High definition (HD) television video data is encoded in a format that provides higher resolution than standard format video. For example, HD formats include 1280 pixel by 720 pixel progressive frames, 1920 pixel by 1080 pixel interlaced frames, or 720 pixel by 480 pixel progressive frames. HD formats are described in greater detail in "ATSC Digital Television Standard" available from Advanced Television Systems Committee (September 1995).

Video decoding hardware such as televisions, video cassette recorders (VCRs) and other devices designed to operate with SD video data generally cannot decode HD video data. Because a large base of SD devices are currently in use and many users are unable or unwilling to upgrade SD devices to HD devices, conversion devices have been developed.

FIG. 1 is a block diagram of one conversion of high definition video data to standard definition video data. In general, conversion according to FIG. 1 is performed on frames stored in memory and the converted frames are returned to memory prior to output.

High definition video frame 110 is stored in memory 100. High definition video frame 110 can be decoded and transferred to memory 100 in any manner. Conversion circuitry and/or software 150 reads high definition video frame 110 from memory and converts the high definition frame to a standard definition frame. Conversion circuitry and/or software 150 returns standard definition video frame 120 to memory 100. Video driver 170 reads standard definition video frame 120 from memory 100 to generate output to a display device (not shown in FIG. 1).

However, the conversion of FIG. 1 requires storage of a complete HD frame in memory. If the memory is external to the conversion circuitry, each conversion incurs additional latency to access memory twice (one read and one write). If the memory and the conversion circuitry are included on the same integrated circuit chip, the cost of the integrated circuit is increased. What is needed is an improved method and apparatus for conversion of video data.

SUMMARY OF THE INVENTION

A method and apparatus for conversion of video data is described. A stream of video data encoded according to a source format is converted to a stream of video data encoded according to a destination format. The video data encoded according to the destination format is stored in a buffer. An output stream of video data is generated from data stored in the buffer, wherein access to the data in the buffer is triggered when the data stored in the buffer reaches a threshold value.

In one embodiment, the threshold value is determined based, at least in part, on a horizontal scaling factor and a vertical scaling factor from the source format to the destination. In one embodiment, the threshold value is determined based, at least in part, on a vertical region of interest within the video data encoded according to the source format.

BRIEF DESCRIPTION OF THE DRAWINGS

The invention is illustrated by way of example, and not by way of limitation in the figures of the accompanying drawings in which like reference numerals refer to similar elements.

DETAILED DESCRIPTION

A method and apparatus for real time video data conversion is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The invention is described herein as converting from video data from high definition format to standard definition format. However, the invention is equally applicable to conversion between high definition formats as well as between other formats. Thus, the specification should not be interpreted to limit conversion between high definition video to standard definition video.

In one embodiment, the invention provides a method and apparatus for conversion of video data from a high definition (HD) format to a standard definition (SD) format. Conversion is performed in real time and intermediate data is stored in a buffer. Converted video data is written into the buffer at a first clock rate and read out of the buffer at a second clock rate. In order to avoid overflow and underflow conditions, a threshold value is determined based, at least in part, on the video format being converted. The threshold value indicates a point in frame conversion at which converted data is read out of the buffer. The HD frame rate is also matched to the SD frame rate.

Figure 1:
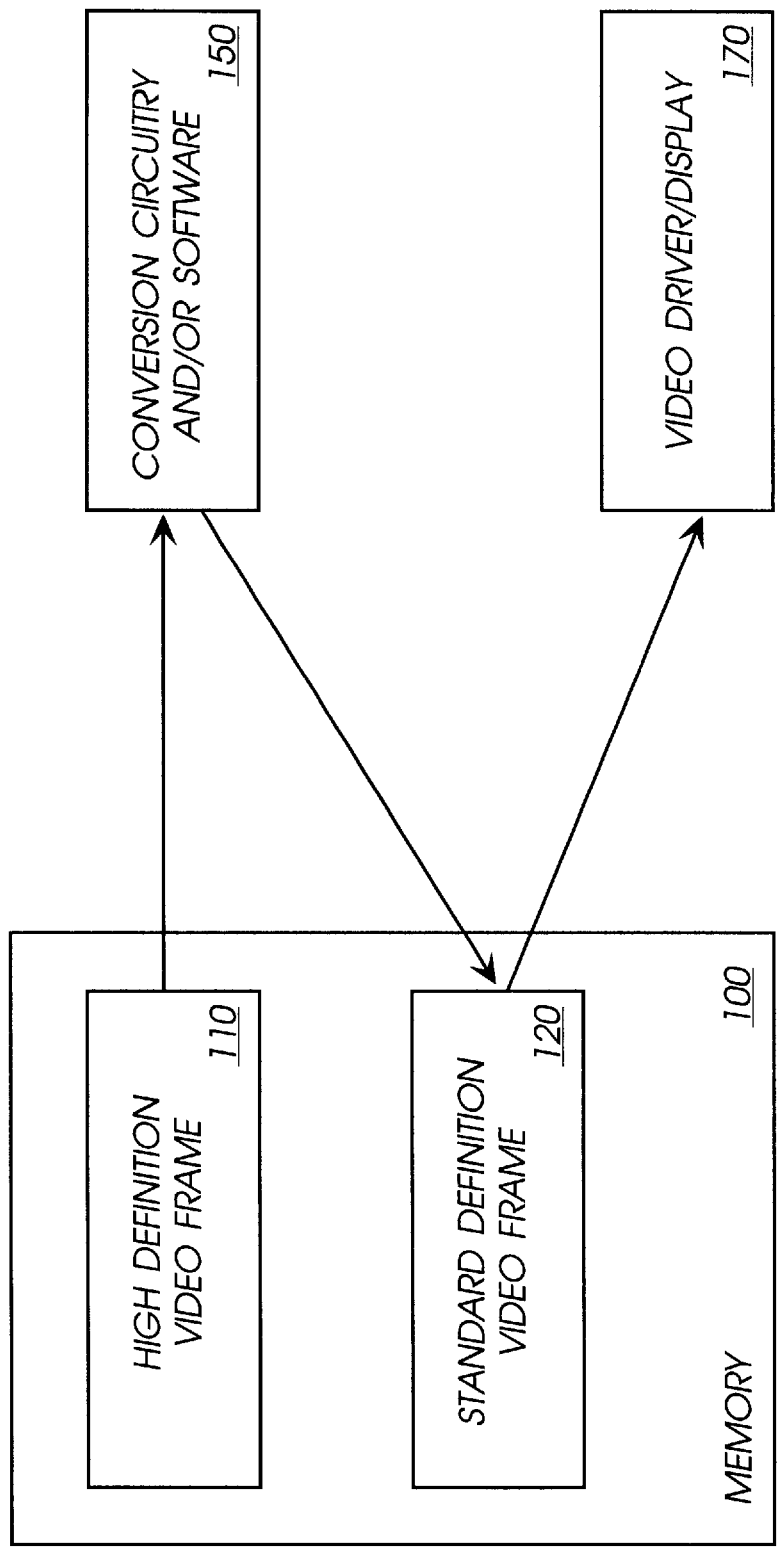
FIG. 1 is a block diagram of one conversion of high definition video data to standard definition video data.
Figure 2:
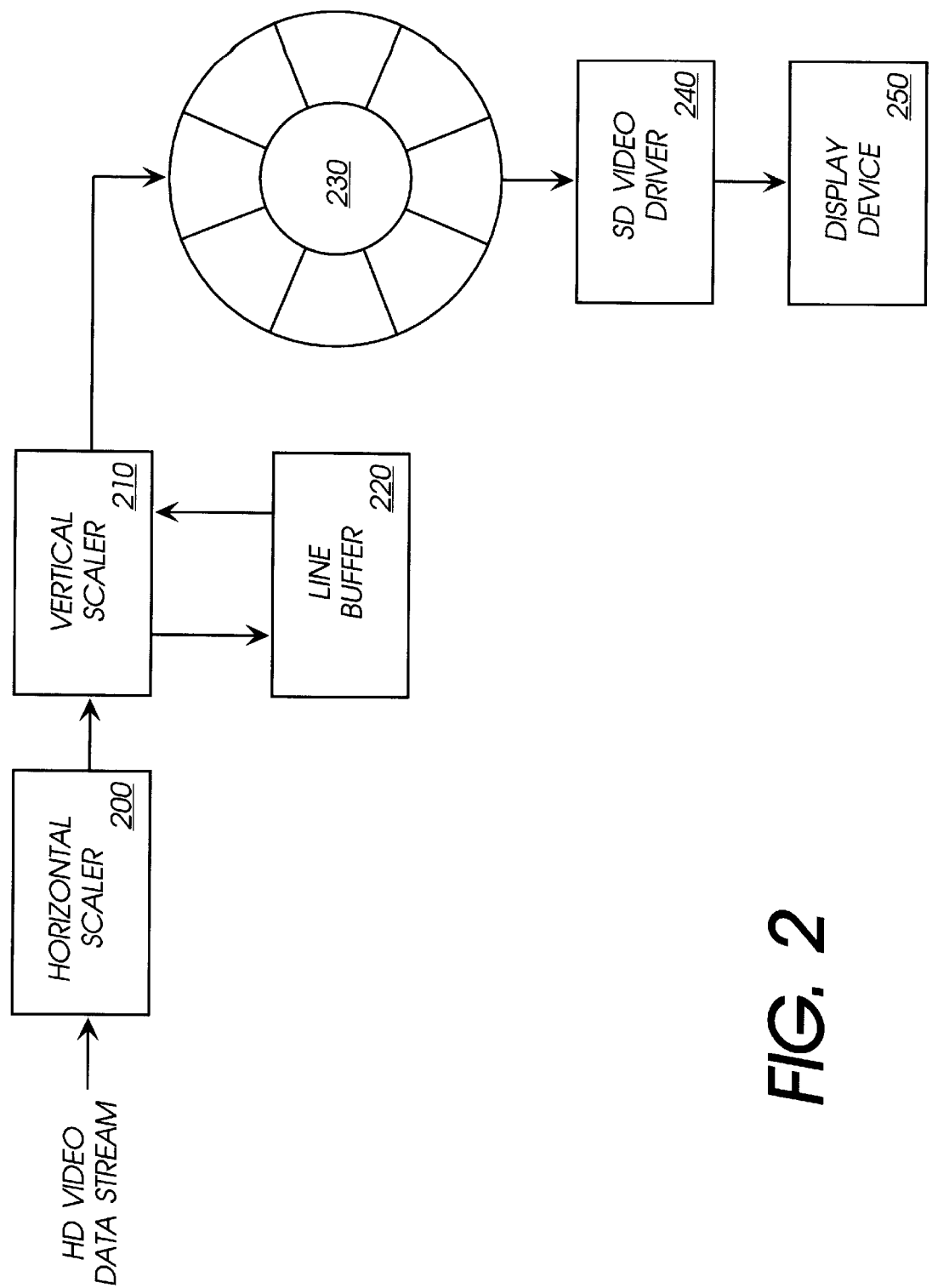
FIG. 2 is a block diagram of video stream format conversion according to one embodiment of the invention.

FIG. 2 is a block diagram of video stream format conversion according to one embodiment of the invention. Conversion according to the invention is accomplished without storing the complete HD format frames in memory, converting the frame and returning the corresponding SD format frame to memory. Conversion is thereby more efficient than if complete frames are stored in memory and accessed for conversion purposes.

Horizontal scaler 200 receives a high definition formatted video data stream and performs horizontal scaling operations. For example, when converting from 1080 line interlaced (1080*i*) video frames to standard definition 480 line interlaced (480*i*), horizontal scaler 200 converts a high definition line represented by 1920 pixels to a corresponding standard definition line represented by 720 pixels.

In one embodiment, horizontal scaler 200 provides a 2-tap resampling digital filter according to the following:

```
phase = HFS;
acc = 0;
newHFS = HFS;
w = HFM;
for(i = XPOS; i < XPOS+hsize; i++)
{
    sample = inSample( );
    if(phase < 256)
        acc += round(newHFS * sample);
    else
    {
        phase &= 0xFF;
        outSample(acc + round((newHFS − phase) * sample));
        acc = round (phase * sample);
    }
    if(w<0)
    {
        newHFS = HFS + 1;
        w += HFN;
    }
    else
    {
        w +=HFM;
        newHFS = HFS;
    }
    phase += newHFS;
}
```

In one embodiment the following values are used:

HFS=int(256*720/hsize)

HFN=hsize*(HFS+1)−256*720

HFM=HFS−256*720 where hsize is the horizontal size of the source image. In alternative embodiments other methods can be used to provide horizontal scaling.

In one embodiment, the filter coefficients used for chroma values are different than the coefficients used for luminance values described above because the number of chroma inputs is different than luma inputs. In one embodiment, the following are used for chroma coefficients:

Chroma_HPS=HFS

Chroma_HFN={0, HFN[11:1]}

Chroma_HFM={1, HFN[11:1]}.

Other chroma coefficients can also be used.

In one embodiment the "acc" value used to store intermediate results is a 10-bit value. The greater the number of bits used to represent acc the more accurate and the more expensive a hardware implementation becomes because memory requirements are greater. If acc is represented with fewer bits, the hardware implementation becomes less expensive and the conversion becomes less accurate.

The horizontally scaled lines output by horizontal scaler 200 are input to vertical scaler 210. Vertical scaler 210 operates with line buffer 220 to vertically scale lines for vertical conversion from HD format to SD format. In one embodiment, vertical scaler 210 receives lines from horizontal scaler 200 and stores the lines in line buffer 220 until a sufficient number of lines are stored to complete the vertical scaling operation. In one embodiment, line buffer is a 720×20 bit memory accessed in a first in/first out (FIFO) manner; however, other memory sizes and access schemes can also be used. Vertical scaling is described in greater detail below with respect to FIG. 3.

Data output by vertical scaler 210 is stored in buffer 230. In one embodiment buffer 230 is a first in/first out (FIFO) buffer. Other types of buffers or memory can be used to store the data output by vertical scaler 210. Buffer 230 stores pixel data that is accessed by standard definition video driver 240 to supply video data to display device 250. In one embodiment, buffer 230 is implemented with a 1445×16 bit memory; however, other memory sizes can also be used.

In one embodiment, the HD format from which video data is converted is used as a factor to determine a threshold value that is used to control buffer 230. The threshold value is used to trigger SD video driver 240 to start requesting data from buffer 230. As described in greater detail below, the threshold value is chosen to provide a minimal buffer size while avoiding underflow or overflow of data for conversion of a frame of data. Other factors that can affect the threshold value include a region of interest in the HD frame and scaling factors applied by horizontal scaler 200 and vertical scaler 210. In one embodiment the threshold value is software programmable. Threshold programability allows the threshold value to be changed, for example, when the format of the input video changes.

Figure 3:
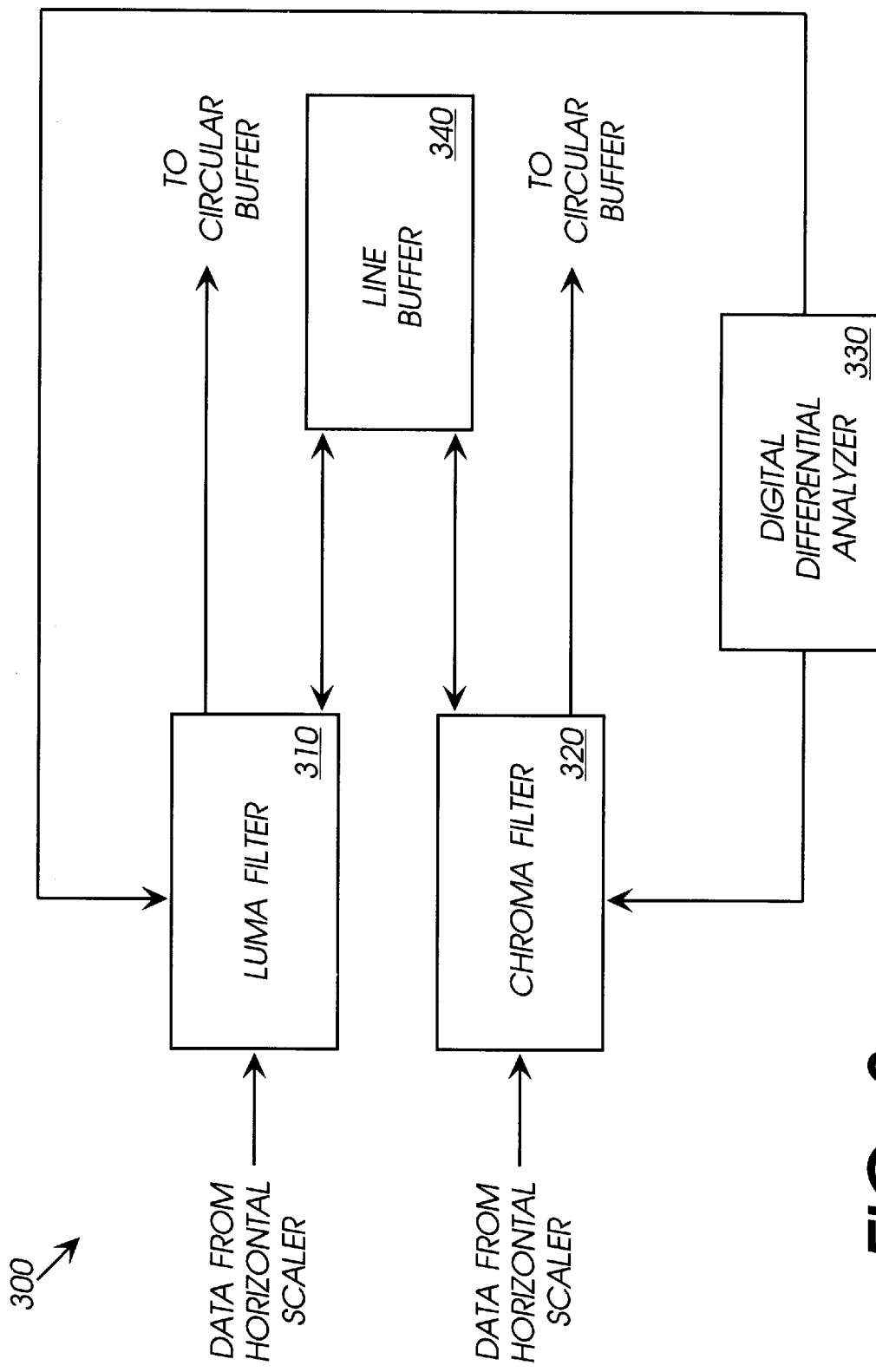
FIG. 3 is a block diagram of a vertical scaler according to one embodiment of the invention.

FIG. 3 is a block diagram of a vertical scaler according to one embodiment of the invention. In one embodiment vertical scaler 300 includes two identical data paths; one for luma processing and one for chroma processing.

Luma filter 310 and chroma filter 320 receive data from horizontal scaler 200 (not shown in FIG. 3). In one embodiment, both luma filter 310 and chroma filter 320 provide a 2-tap polyphase resampling filtering as described below. Digital differential analyzer 330 tracks the ratio of input to output sample rates and provides filter coefficient information to luma filter 310 and chroma filter 320.

In one embodiment, vertical scaler 300 operates according to the following:

if(initialization required)

```
{
    phase = value from Table 1 below;
    bypass = value from Table 1 below;
}
else
{
    phase = vdda_ph;
    if(VFS == 0)
        bypass = 1;
    else
        bypass = 0;
}
acc = 0;
newVFS = phase,      // Initialze to VFS in normal case
w = VFM;
for(i = XPOS; i < XPOS+vsize; i++)
{
    sample = inSample( );
    if(phase<256)
        acc += round(newVFS*sample);
    else
    {
```

-continued

```
    phase &= 0xFF;
    if(bypass == 1)
        outSample(sample);
    else
        outSample(acc + round((newVFS - phase) * sample));
    acc = round(phase * sample);
}
if(VFS == 0)
    bypass = 1;
else
    bypass = 0;
if(w<0)
{
    newVFS = VFS = 1;
    w += VFN;
}
else
{
    w += VFM;
    new VFS = VFS;
}
phase += newVFS;
}
```

In one embodiment, the following values are used:

VFS=int(256*601vsize/vsize)

VFN=vsize*(VFS+1)−256*601size

VFM=vsize*VFS−256*601vsize

In one embodiment, 601 vsize is 243 for NTSC output and 288 for PAL output; however, other values for vsize can also be used. In one embodiment the following values are used to initialize vertical scaler 300. Other values can also be used. The variable "vdda_ph" is described in greater detail below.

TABLE 1

One embodiment of vertical filter phase initialization for progressive video input

| Current Display Field | VFS < 128 | VFS >= 128 |
|---|---|---|
| Top Field | (phase, bypass) = (vdda_ph + 128, 0) | (phase, bypass) = (vdda_ph + 128 − 256, 1) |
| Bottom Field | (phase, bypass) = (vdda_ph, 0) | (phase, bypass) = (vdda_ph, 0) |

Intermediate filter results are stored in line buffer 340. In one embodiment, line buffer 340 is a 720×20 bit memory, where 10 bits are used to store luminance data and 10 bits are used to store chrominance data. Other memory sizes, for example, a 16 bit wide memory with 8 bits for luminance data and 8 bits for chrominance data, can be used. In one embodiment, the buffer size is chosen to be a minimal value while providing sufficient accuracy.

In one embodiment, data output by luma filter 310 and chroma filter 320 provides input to a buffer. In order to convert between HD video and SD video in real time, the buffer is used between the video streams. Typical HD video streams operate at a nominal pixel rate of 74.125 MHz and typical SD video streams operate at a pixel rate of 13.5 MHz. Other input and/or output pixel rates can also be supported. In addition to different pixel rates, HD video frames/fields have a different number of pixels per line and a different number of lines as compared to SD frames/fields.

In one embodiment the buffer size is chosen to be a minimal while preventing both underflow and overflow in the buffer. A threshold value is used to trigger the SD video driver to start reading data out of the buffer. The threshold value is also affected by the size of the region of interest within the HD video stream as well as horizontal and/or vertical scaling factors.

Figure 4:
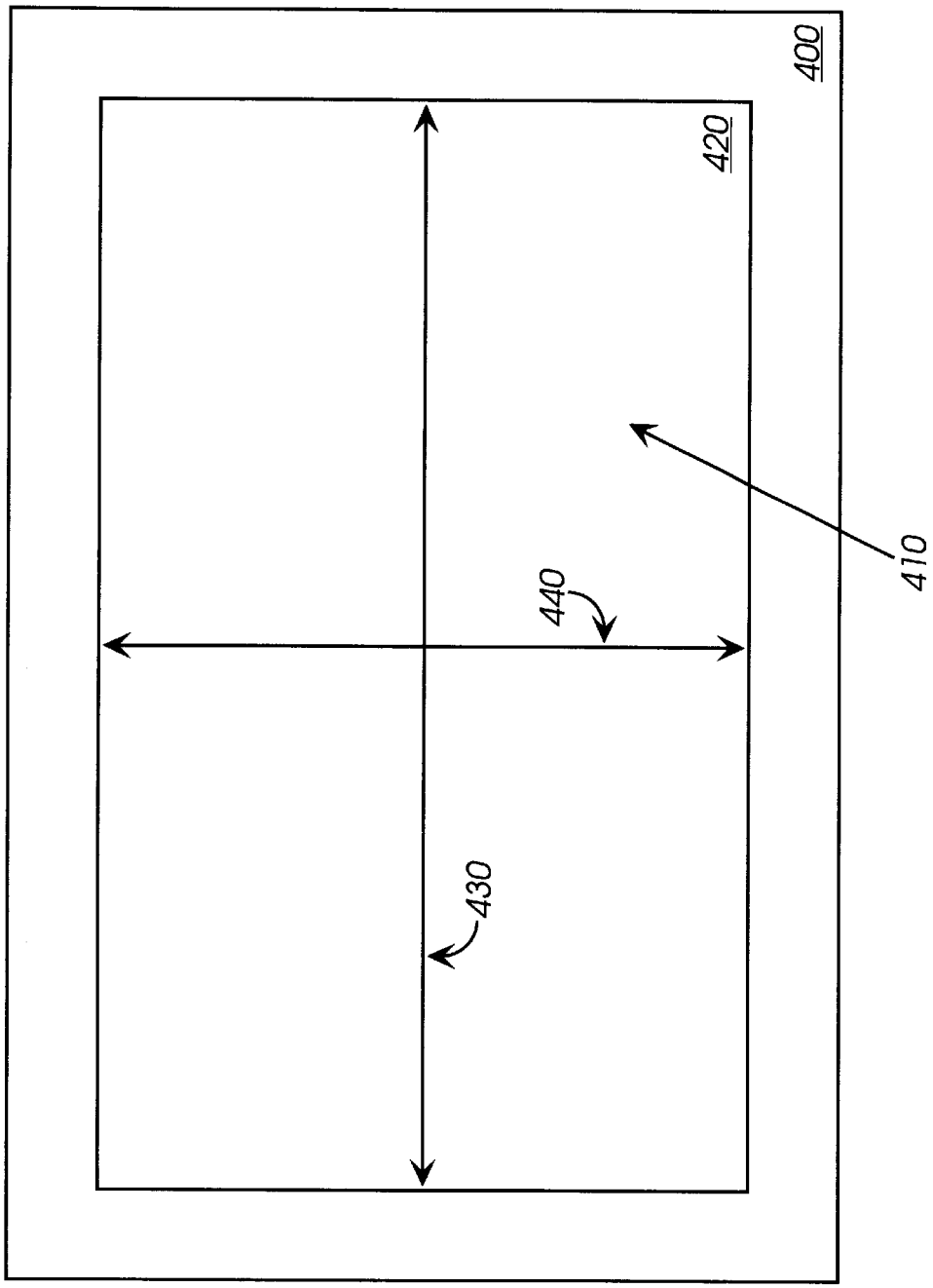
FIG. 4 illustrates a relationship between a high definition video frame and a standard definition video frame.

FIG. 4 illustrates a relationship between a high definition video frame and a standard definition video frame. Starting position 420 represents a starting position for region of interest 410 of HD frame 400. As described herein, starting position 420 includes a horizontal starting position (XPOS) and a vertical starting position (YPOS); however, starting position 420 can be defined in another manner.

In one embodiment, starting position 420 can vary from frame to frame in order to capture the most important portion of HD frame 400. In an alternative embodiment starting position 420 can be fixed for a series of HD frames. Horizontal scaling factor 430 and vertical scaling factor 440 in combination with starting point 420 define region of interest 410. In one embodiment, region of interest 410 corresponds to the portion of HD frame 400 that is converted to a SD frame.

In one embodiment, the following values are used for NTSC (720×480 interlaced) output:

TABLE 2

NTSC conversion parameters according to one embodiment of the invention.

| Input Format | 1920 × 1080 Interlaced | 1280 × 720 Progressive |
|---|---|---|
| Region of Interest | 1452 × 1040 Interlaced | 970 × 695 Progressive |
| Threshold Value | 625 | 721 |
| HFS | 126 | 190 |
| HFN | 84 | 950 |
| HFM | −1368 | −20 |
| VFS | 119 | 89 |
| VFN | 192 | 342 |
| VFM | −328 | −353 |
| XPOS | 234 | 155 |
| YPOS | 10 | 12 |

In an alternative embodiment, other parameters can be used. Also, the parameters of Table 2 can be developed for a PAL output as the SD output format.

In one embodiment, four 32-bit registers are used to provide values used for conversion. The four registers are described below; however, other configurations as well as other register values can also be used.

The configuration register indicates an initialization value for the vertical digital differential analyzer (referred to as vdda_ph in Table 1). In one embodiment the initialization value is equivalent to the appropriate VFS value; however, other values can also be used. The configuration register also stores the threshold value for accessing the circular buffer.

The position register provides the starting position of the region of interest and defines the area of the HD video frame that is converted to a SD video frame. The position buffer includes a horizontal starting position (XPOS) for the region of interest as well as a vertical starting position (YPOS) of the region of interest.

The horizontal scaling register provides the HFS, HFN and HFM values described above with respect to horizontal scaling. The HFS value indicates the fractional step size between input and output samples. The HFN value is a positive parameter used by the horizontal digital differential analyzer to control overshoot. The HFM value is a two's complement value used by the horizontal digital differential analyzer to control undershoot. In one embodiment, the HFS, HFN and HFM values are used as described in greater detail above.

The vertical scaling register provides the VFS, VFN and VFM values described above with respect to vertical scaling. The VFS value indicates the fractional step size between input and output samples. The VFN value is a positive parameter used by the vertical digital differential analyzer to control overshoot. The VFM value is a two's complement value used by the vertical digital differential analyzer to control undershoot. In one embodiment, the VFS, VFN and VFM values are used as described in greater detail above.

The following method can be used to determine an optimal threshold value for the buffer. The method is based on a binary search to search for the optimal threshold value.

In one embodiment, the simulations of the scaling operations discussed above are used to predict the behavior of inputs and outputs to the buffer. From this simulation, the maximum and minimum number of entries in the buffer can be determined for any particular frame conversion. From the maximum and minimum determined, an optimal threshold value and optimal buffer size can be determined.

In one embodiment, the threshold value is determined according to the following:

```
main( )
    initialize values;
    //DO loop begin
    Do each (threshold value = (top-bottom/2)
        for each vertical line
            if(primary input is active range and in region of interest)
                calculate new vphse and vw;
                reset hphase and hw;
            else
                if both HD and SD are in the blanking period then
                    reset FIFOcount
            //process SD output data
            for each pixel
                if(FIFO watermark has been reached)
                    set output enable = 1;
                    reset output position (initialize v601 count, h601 count,
                                                        phase 601 and w601)
                if(output enable = 1)
                    call out601( ) function
            //process HD input data
            if(primary input is active range and in region of interest)
                if( vphase>255 and current pixel is an active pixel)
                    calculate new hphase and hw;
                    if hphase > 255 then
                        if input is interlaced
                            FIFOcount++ and update the max value of
                                                        the FIFO count;
                        else input is progressive
                            for(every other line)
                                FIFOcount++ and update the max value of
                                                        the FIFO count
                        hphase &= 0xFF
                if(primary input is active and in region of interest)
                    if (vphase>255)
                        vphase &= 0xFF
    //DO loop end
    check whether (top = bottom) or (top = bottom+1)
        if so, then exit program
    check whether min FIFO count < 0,
        if so, set bottom = current threshold value
        repeat DO loop
    else
        set top = current threshold value
        repeat DO loop
out601( )
    if v601 count not more than the end of the vertical field
        calculate new hphase01, hw601
        if an output pixel needed
            if pixel in active range of output frame
                FIFOcount-- and update the min value of the FIFO count
            H601++
            if end of horizontal line
                v601count++
            hphase601 &= 0xFF
```

Figure 5:
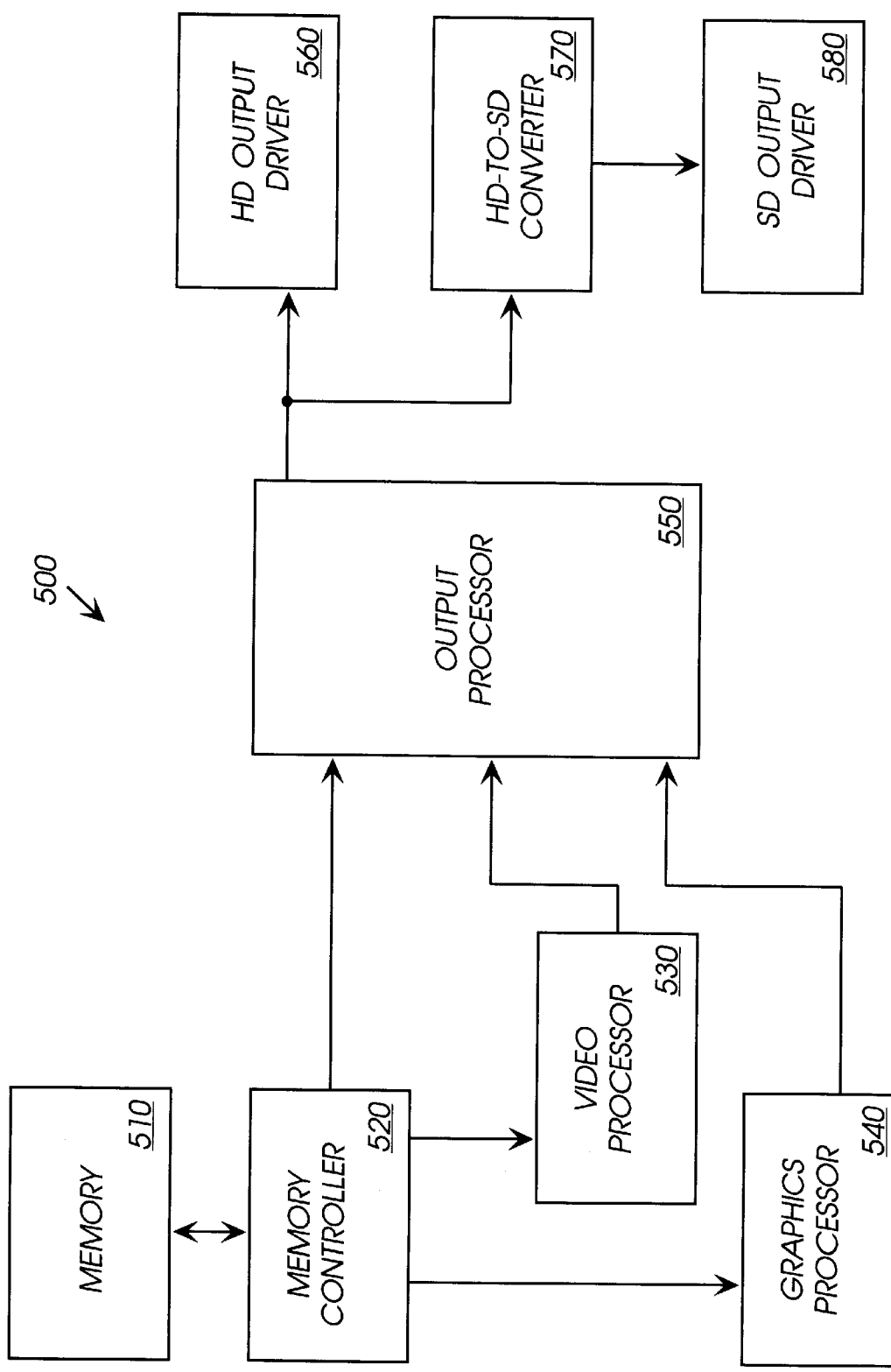
FIG. 5 is a block diagram of a video system suitable for use with the invention.

FIG. 5 is a block diagram of a video system suitable for use with the invention. Video system 500 receives HD video data and outputs both HD video and SD video in real time. In other words, the SD output of system 500 is approximately synchronized with the HD output of system 500. Memory controller 520 accesses memory 510 to retrieve video data.

In one embodiment, memory controller outputs three types of data. Graphics processor 540 receives graphics data from memory controller 540. Video processor 530 receives video data from memory controller 520. Output processor receives video data from video processor 530 and graphics data from graphics processor 540 and cursor data from memory controller 520. Output processor 550 layers the video data, the graphics data and the cursor data to generate a high definition video output image. It is not necessary to have multiple layers of video data to practice the invention.

Output processor 550 provides a HD output to HD output driver 560, which in turn drives a display or other output device (not shown in FIG. 5). Output processor 550 also provides a HD output to HD-to-SD converter 570. HD-to-SD converter 570 performs real time conversion on the HD video data to generate SD video data. The SD video data is input to SD output driver that drives an output device (not shown in FIG. 5), for example a VCR.

Thus, video system 500 provides both HD and SD outputs from a single HD input. Video system 500 is useful for example, to drive a digital television with the HD output and an analog VCR with the SD output. Of course, the outputs can be used for other purposes and a different number of outputs can be provided.

In the foregoing specification the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method of converting video data, the method comprising:
   converting a stream of video data representing a frame of data encoded according to a source format to a stream of video data representing the frame of data encoded according to a destination format;
   storing the stream of video data encoded according to the destination format in a buffer; and
   generating an output stream of video data from data stored in the buffer, wherein access to the data in the buffer is triggered when the data stored in the buffer reaches a threshold value, the threshold value representing an intermediate memory location of the buffer.

2. The method of claim 1 wherein converting video data encoded according to a source format to video data encoded according to a destination format comprises:
   horizontally scaling the video data encoded according to the source format based, at least in part, on a horizontal scaling factor to generated horizontally scaled video data; and
   vertically scaling the horizontally scaled video data based, at least in part, on a vertical scaling factor to generate video data encoded according to the destination format.

3. The method of claim 2 wherein vertically scaling the horizontally scaled video data comprises temporarily storing horizontally scaled data in a line buffer.

4. The method of claim 1 wherein the buffer is maintained as a first in/first out (FIFO) buffer.

5. The method of claim 1 wherein the threshold value is determined based, at least in part, on a horizontal scaling factor and a vertical scaling factor corresponding to the source format and the destination.

6. The method of claim 1 wherein the threshold value is determined based, at least in part, on a region of interest within the video data encoded according to the source format and the destination format.

7. The method of claim 1 wherein the converting the video data encoded according to the source format to the video data encoded according to the destination format comprises a substantially real time conversion.

8. The method of claim 1 further comprising generating a video output signal corresponding to the destination format.

9. An apparatus for converting video data, the apparatus comprising:
   means for converting a stream of video data representing a frame of data encoded according to a source format to a stream of video data representing the frame of data encoded according to a destination format;
   means for storing the stream of video data encoded according to the destination format in a buffer; and
   means for generating an output stream of video data from data stored in the buffer, wherein access to the data in the buffer is triggered when the data stored in the buffer reaches a threshold value, the threshold value representing an intermediate memory location of the buffer.

10. The apparatus of claim 9 wherein the means for converting video data encoded according to the source format to video data encoded according to the destination format comprises:
    means for horizontally scaling the video data encoded according to the source format based, at least in part, on a horizontal scaling factor to generated horizontally scaled video data; and
    means for vertically scaling the horizontally scaled video data based, at least in part, on a vertical scaling factor to generate video data encoded according to the destination format.

11. The apparatus of claim 10 wherein the means for vertically scaling the horizontally scaled video data comprises means for temporarily storing horizontally scaled data in a line buffer.

12. The apparatus of claim 9 wherein the threshold value is determined based, at least in part, on a horizontal scaling factor and a vertical scaling factor corresponding to the source format and the destination format.

13. The apparatus of claim 9 wherein the threshold value is determined based, at least in part, on a region of interest within the video data encoded according to the source format and the destination format.

14. The apparatus of claim 9 wherein the means for converting the video data encoded according to the source format to the video data encoded according to the destination format comprises a substantially real time conversion.

15. The apparatus of claim 9 further comprising means for generating a video output signal corresponding to the destination format.

16. A system comprising:
    a high definition video data processor to receive a stream of high definition video data; and
    a down converter coupled to the high definition video data processor to convert the stream of high definition video data to a stream of standard definition video data, wherein the down converter temporarily stores portions of a frame of standard definition video data in a circular buffer until a threshold value is reached and outputs the standard definition video frame in response to the threshold value being reached.

17. The system of claim 16 wherein the down converter comprises:
a horizontal scaler to receive high definition video data and horizontally scale the high definition to generate horizontally scaled video data; and
a vertical scaler coupled to the horizontal scaler, the vertical scaler to generate standard definition video data.

18. The system of claim 17 further comprising a first in/first out (FIFO) buffer coupled to the vertical scaler, the buffer to store standard definition video data generated by the vertical scaler, wherein standard definition video data is read out of the buffer when a threshold value amount of standard definition video data is stored in the buffer.

19. The system of claim 18 further comprising a standard definition video driver coupled to the buffer, the standard definition video driver to output standard definition video signals.

20. The system of claim 16 wherein the threshold value is based, at least in part, on a horizontal scaling factor and a vertical scaling factor for the high definition video data.

21. The system of claim 16 wherein the threshold value is based, at least in part, on a region of interest within the high definition video data.

* * * * *